United States Patent
Takahashi et al.

(10) Patent No.: US 7,973,102 B2
(45) Date of Patent: Jul. 5, 2011

(54) RESIN COMPOSITION AND RESIN MOLDED OBJECT

(75) Inventors: Shun Takahashi, Yokohama (JP); Motoki Takata, Yokohama (JP)

(73) Assignee: Shiseido Company, Ltd., Tokyo (JP)

( * ) Notice: Subject to any disclaimer, the term of this patent is extended or adjusted under 35 U.S.C. 154(b) by 500 days.

(21) Appl. No.: 10/580,336

(22) PCT Filed: Nov. 19, 2004

(86) PCT No.: PCT/JP2004/017294
§ 371 (c)(1),
(2), (4) Date: May 24, 2006

(87) PCT Pub. No.: WO2005/052062
PCT Pub. Date: Jun. 9, 2005

(65) Prior Publication Data
US 2007/0093588 A1   Apr. 26, 2007

(30) Foreign Application Priority Data

Nov. 25, 2003   (JP) .................................. 2003-394176

(51) Int. Cl.
*C08K 5/56* (2006.01)
*C08K 3/34* (2006.01)

(52) U.S. Cl. ........ 524/262; 524/265; 524/442; 524/445; 524/447

(58) Field of Classification Search ................. 524/445, 524/447, 262, 265, 442
See application file for complete search history.

(56) References Cited

U.S. PATENT DOCUMENTS

| | | | |
|---|---|---|---|
| 5,494,955 A * | 2/1996 | Swor et al. .................... 524/496 |
| 5,514,734 A | 5/1996 | Maxfield et al. | |
| 5,605,982 A | 2/1997 | Chao et al. | |
| 6,210,614 B1 * | 4/2001 | Gardner et al. .............. 264/46.5 |
| 6,239,195 B1 * | 5/2001 | Suzuki et al. ................. 523/204 |
| 6,384,121 B1 * | 5/2002 | Barbee et al. ................ 524/445 |
| 6,583,208 B1 * | 6/2003 | Suzuki .......................... 524/445 |
| 2003/0216496 A1 * | 11/2003 | Mohanty et al. .............. 524/284 |
| 2004/0024102 A1 * | 2/2004 | Hayes et al. .................. 524/445 |
| 2004/0097366 A1 | 5/2004 | Sato et al. | |
| 2008/0069993 A1 * | 3/2008 | Kawahara et al. ........... 428/36.6 |

FOREIGN PATENT DOCUMENTS

| | | |
|---|---|---|
| JP | 62-177804 | 8/1987 |
| JP | 05-194851 | 8/1993 |
| JP | 05-194851 A | 8/1993 |
| JP | 9-295809 A | 11/1997 |
| JP | 2000-128521 | 5/2000 |
| JP | 2000-128521 A | 5/2000 |
| JP | 2000-355640 | 12/2000 |
| JP | 2001-089646 | 4/2001 |
| JP | 2002-338796 | 11/2002 |
| JP | 2002-348414 | 12/2002 |
| JP | 2003-113326 | 4/2003 |
| JP | 2003-221209 A | 8/2003 |
| JP | 2005-068262 | 3/2005 |
| WO | WO 93/11190 * | 6/1993 |
| WO | WO 9311190 A1 * | 6/1993 |
| WO | WO 02/079275 | 10/2002 |

* cited by examiner

*Primary Examiner* — Vickey Nerangis
(74) *Attorney, Agent, or Firm* — IPUSA, PLLC

(57) ABSTRACT

A resin composition which reduces hydrolysis thereof and reduces the color change thereof at the time of heating and a resin molded object which reduces hydrolysis thereof and reduces quality change of content therein are provided. The resin composition includes a resin and an organically modified layered silicate in which a substituted silyl group having a substituted or non-substituted alkyl group bonds to a layered silicate. The resin molded object is obtained by molding a resin composition including a resin and an organically modified layered silicate in which a substituted silyl group having a substituted or non-substituted alkyl group bonds to a layered silicate.

4 Claims, 8 Drawing Sheets

RESIN COMPOSITION AND RESIN MOLDED OBJECT

TECHNICAL FIELD

The present invention relates to a resin composition and a resin molded object.

BACKGROUND ART

In modern society, a variety of resins is used as materials for living consumer items including a container for a cosmetic product. Particularly, environmental problems on a global scale are taken into account, and recently, attention is paid to the utilization of a biodegradable resin as a material for a living consumer item, which is a resin capable of degrading in a natural environment. Since such a biodegradable resin is finally decomposed into water and carbon dioxide through hydrolysis thereof or by microbes or an enzyme, it is excellent in that no biological concentration or environmental hormone effect is caused and an environment is not contaminated.

However, the gas-barrier property of a resin molded object that is obtained by molding only resin is generally insufficient. Therefore, when liquid or gas is preserved in a resin molded object such as a container for cosmetic, leakage of content in the molded object or quality change of content in the molded object may be caused. Also, the rate of biodegradation of a biodegradable resin is not necessarily large.

Therefore, in order to improve the gas-barrier property of a resin molded object and to keep the rigidity of the molded object of biodegradable resin sufficiently high and enhance the rate of biodegradation thereof, a resin composition in which an organically modified clay mineral obtained by ion-exchanging cations of a clay mineral for organic ions is added to a resin is used for the resin molded object. Herein, in many cases, an organic onium ion is used for the organic ion for ion-exchange in a clay mineral.

For example, a biodegradable resin that contains a swelling layered silicate and a polyester for which the main repeated units are lactic acid is disclosed as a biodegradable polyester resin excellent in the gas-barrier property thereof (see JP-A-2002-338796). Herein, the swelling layered silicate is, for example, a silicate salt treated with an organic onium ion such as a quaternary ammonium ion in which four mutually independent alkyl or alkyleneoxy groups with a carbon number of 1-30 bond to the nitrogen atom thereof.

Also, as a biodegradable resin composition for keeping the rigidity of a biodegradable resin molded object sufficiently high and enhancing the biodegradation rate thereof, a biodegradable resin composition is disclosed which contains a biodegradable resin and a layered clay mineral organized with a organizing agent dispersed in the biodegradable rein, wherein the average particle diameter of the organized layered clay mineral is 1 μm or less (see JP-A-2001-089646). Herein, the organizing agent is an organic onium compound such as an organic ammonium compound containing a primary, secondary, tertiary or quaternary ammonium ion, an organic phosphonium compound, an organic pyridinium compound, and an organic sulfonium compound.

On the other hand, a layered organic silicate is a compound in which a silyl group having an alkyl group bonds to the oxygen atom of a silanol group ($\equiv$Si—OH) of a layered silicate, and a porous layered silicate which selectively adsorbs an alcohol is disclosed (see JP-A-2000-128521). In this porous layered silicate, a silyl group having one alkyl group in which the carbon number of the linear portion thereof is 6 through 20 and one or two hydroxyl groups bonds to a layer of the layered silicate.

However, the heat resistance of the resin composition is insufficient in which an organically modified clay obtained by ion-exchanging cations of a clay mineral for organic onium ions is added to a resin. That is, as the resin composition is heated for molding the resin composition, the color of the resin composition changes to yellow independently of the kind of a resin to which an organically modified clay mineral is added.

Also, when the resin to which an organically modified clay mineral is added is a resin such as a polyester-based resin, a polyesteramide-based resin, and a polyestercarbonate-based resin, the organically modified clay mineral obtained by ion-exchanging cations of a clay mineral for organic onium ions accelerates hydrolysis of the resin so as to reduce the rigidity of a molded object that is formed from a resin composition containing the organically modified clay mineral and the resin.

Further, the quality of content contained in the molded object that is formed from a resin composition containing the organically modified clay mineral may be changed (the smell of the content may be changed).

DISCLOSURE OF THE INVENTION

Problems to be Solved by the Invention

One object of the present invention is to provide a resin composition which reduces hydrolysis thereof and reduces the color change thereof at the time of heating.

Another object of the present invention is to provide a resin molded object which reduces hydrolysis thereof and reduces quality change of content therein.

Means for Solving the Problem

One of the objects is achieved by a resin composition comprising a resin and an organically modified layered silicate in which a substituted silyl group having a substituted or non-substituted alkyl group bonds to a layered silicate.

Also, one of the objects is achieved by a resin molded object that is molded using the aforementioned resin composition.

Advantageous Effect of the Invention

According to the present invention, a resin composition which reduces hydrolysis thereof and reduces the color change thereof at the time of heating can be provided.

Also, according to the present invention, a resin molded object which reduces hydrolysis thereof and reduces quality change of content therein can be provided.

BEST MODE FOR CARRYING OUT THE INVENTION

Figure 1A:
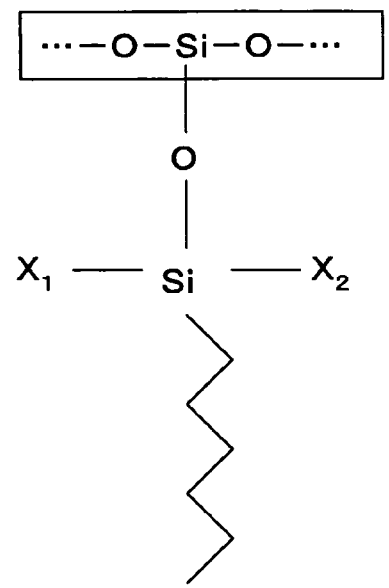
FIG. 1A is a diagram which schematically illustrates an example of an organically modified layered silicate contained in a resin composition according to the present invention.

Next, the embodiments of the present invention are described with the drawings.

First, a resin composition according to the present invention is described. A resin composition according to the present invention contains a resin and an organically modified layered silicate.

Herein, as a resin contained in a resin composition according to the present invention, any of resins can be used. That is, a resin contained in a resin composition according to the present invention may be a biodegradable resin or a non-biodegradable resin. However, since the biodegradable resin can be finally decomposed into water and carbon dioxide through hydrolysis thereof or by microbes or an enzyme, no biological concentration or environmental hormone effect is caused and the contamination of an environment can be reduced. Therefore, it is preferable to use the biodegradable resin as a resin contained in a resin composition according to the present invention.

The biodegradable resin used as a resin contained in a resin composition according to the present invention is not particularly limited if it is a resin that can be decomposed or become low-molecular weight ones by microbes or an enzyme, and there is provided polyester-based resins, polyesteramide-based resins, polyestercarbonate-based resins, polyoses (polysaccharides), polypeptides, lignin, and derivatives thereof.

Herein, the polyester-based resins include aliphatic polyesters, aliphatic polyester copolymers, and mixtures thereof, which polyesters and copolymers can be obtained by condensation polymerization of at least one kind of diols such as ethylene glycol, 1,4-butanediol, 1,6-hexanediol, decamethylene glycol and neopentyl glycol and at least one kind of aliphatic dicarboxylic acids such as succinic acid, adipic acid, suberic acid, sebacic acid, dodecanedioic acid and anhydrides thereof. As examples of the aliphatic polyesters, there can be provided poly(ethylenesuccinate), poly(butylenesuccinate), poly(hexamethylenesuccinate), poly(ethyleneadipate), poly(butyleneadipate), poly(hexamethyleneadipate), poly(ethyleneoxalate), poly(butyleneoxalate), poly(hexamethyleneoxalate), poly(ethylenesebacate), and poly(butylenesebacate). As an example of the aliphatic polyester copolymers, poly(butylenesuccinate-co-butyleneadipate) can be provided.

Additionally, polyols having three or greater hydroxyl groups as well as the diols may be used and aromatic dicarboxylic acids and/or polycarboxylic acids having three or greater carboxyl groups as well as the aliphatic dicarboxylic acids may be used. As polyester-based resins obtained by condensation polymerization of a diol and an aromatic dicarboxylic acid, there can be provided poly(butylenesuccinate-co-butyleneterephthalate) and poly(butyleneadipate-co-butyleneterephthalate).

Also, the polyester-based resins includes poly(hydroxylic acid)s and copolymers thereof. As examples of the poly(hydroxylic acid)s, there can be provided poly(lactic acid), polyglycolic acid, poly(ε-caprolactone), poly(β-propiolactone), poly(δ-valerolactone), poly (3-hydroxyvalerate), poly (3-hydroxybutylate), and poly(3-hydroxycaprate).

Also, as polyoses, there can be provided celluloses, hemicelluloses, chitin, and chitosan. The polyoses may be polyose derivatives in which at least one portion of the molecule is substituted with another chemical substance or another chemical substance is added to at least one portion of the molecule. As cellulose derivatives, there can be provided, for example, methylcellulose and carboxymethylcellulose.

Also, as polypeptides, for example, collagen and collagen derivatives can be provided.

Also, lignin is a resin with a phenylpropane skeleton which is obtained from a lignified plant body, or a derivative thereof and the isolation method thereof is not limited.

Additionally, the polyester-based resin(s), the polyesteramide-based resin(s), polyestercarbonate-based resin(s), the polyose (polysaccharide)(s), the polypeptide(s), the lignin(s) and the derivatives thereof may be used singularly or in combination.

Among the biodegradable resins, it is easy to obtain poly(lactic acid) since the material thereof is a material originating from a plant (such as corn). Therefore, if poly(lactic acid) is used as a material for a resin molded object, the resin molded object can be easily and inexpensively manufactured. Also, poly(lactic acid) is excellent in the transparency and stability thereof.

As non-biodegradable resins used as a resin contained in a resin composition according to the present invention, there can be provided polyolefins such as polyethylene and polypropylene, vinyl polymers such as polyvinyl chloride, polyvinylidene fluoride, polytetrafluoroethylene, polyvinyl acetate and polystyrene, polyamides, polyesters except the polyester-based resins as biodegradable resins, polycarbonates, polybutadiene, vinyl copolymers such as butadiene/styrene copolymer, ethylene/propylene copolymer, butadiene/acrylonitrile copolymer and ethylene/propylene/diene copolymer, elastomers such as natural rubbers, acrylic rubbers, chlorinatedbutyl rubbers and chlorinated polyethylene, or acid-modified substance thereof which has been modified by, for example, maleic anhydride, styrene/maleic anhydride copolymer, styrene/phenylmaleimide copolymer, polyacetals, polysulfones, phenoxy resins, polyphenylene sulfides, polyphenylene ethers, polyether sulfones, polyether ketones, polymethyl methacrylate, and polyallylates, etc.

Next, an organically modified layered silicate contained in a resin composition according to the present invention is described. In the organically modified layered silicate, a substituted silyl group having a substituted or non-substituted alkyl group bonds to a layered silicate, which is a kind of clay mineral. That is, the organically modified layered silicate is a layered silicate silylated with a silane compound having a substituted or non-substituted alkyl group. Herein, the layered silicate is a compound having a silanol group ($\equiv$Si—OH) on a surface of plural layers (of which the compositional formula is $SiO_2$) which are formed by bonding a Si and an O each other. It is preferable that these silanol groups also exist between the layers of the layered silicate.

A substituted silyl group having a substituted or non-substituted alkyl group bonds to at least one of the oxygen atoms of these silanol groups ($\equiv$Si—OH) contained in the layered silicate. Herein, the substituted silyl group is an organic group in which a hydrogen atom of a silyl group (—$SiH_3$) is replaced by a particular substituent, which includes a substituted or non-substituted alkyl group.

The substituted silyl group has at least one (1 or greater and 3 or less) substituted or non-substituted alkyl group. That is, at least one (1 or greater and 3 or less) of the hydrogen atoms of a silyl group is substituted with a substituted or non-substituted alkyl group. Also, each alkyl group may be either a linear alkyl group or a branched alkyl group. Specifically, each alkyl group is selected from the group including a methyl group, and an ethyl group and, linear and branched, propyl groups, butyl groups, pentyl groups, hexyl groups, heptyl groups, octyl groups, nonyl groups, decyl groups, undecyl groups, dodecyl groups, tridecyl groups, tetradecyl groups, pentadecyl groups, hexadecyl groups, heptadecyl groups, octadecyl groups, nonadecyl groups, and icosyl groups. Further, the alkyl group may have a substitutent (atomic group) or may not have a substitutent (atomic group). Also, the position of a substituent in the alkyl group is an arbitrary possible position but, preferably, a terminal of the alkyl group at the opposite side of the silicon atom of the substituted silyl group.

On the other hand, each hydrogen atom of the substituted silyl group which atom is not replaced by a substituted or non-substituted alkyl group thereof may be replaced by a substituent selected from the group including a chloro group, a methyl group, an ethyl group, a methoxy group, an ethoxy group, an amino group, an epoxyethyl group, an epoxyethyloxy group, a vinyl group, an isopropenyl group, a 1-phenylvinyl group, a 4-vinylphenyl group, an isocyanate group, and a hydroxyl group, or a single bond to the oxygen atom of another silanol group that is adjacent to a silanol group to which the substituted silyl group bonds. Herein, another silanol group that is adjacent to a silanol group to which the substituted silyl group bonds, as described above, includes both a silanol group of the layered silicate except the silanol group to which the substituted silyl group bonds and a hydroxyl group bonding to the silicon atom of another substituted silyl group (a silanol group contained in another substituted silyl group).

In the organically modified layered silicate, since the substituted silyl group has a substituted or non-substituted alkyl group, the space between layers of a layered silicate can be increased and the dispersability of the layers of the organically modified layered silicate in a resin can be improved. As a result, the gas barrier properties of a resin composition and a resin molded object which can be obtained by molding the resin composition can be improved. Also, in a resin composition according to the present invention, an organic onium ion does not ionically-bond to the oxygen atom of a silanol group of a layered silicate but the substituted silyl group covalently-bond to it. Therefore, the change of the color of a resin composition can be reduced, which is considered to be caused by an organic onium ion dissociating from a clay mineral by heating. Also, since no organic onium ion is used, hydrolysis of a resin with an organic onium ion as a catalyst can be also reduced, and further, quality change of content in a resin molded object can be also suppressed which would be caused by an organic onium ion dissociating from a clay mineral.

Also, when the substituted silyl group has a substituent selected from the group including an amino group, an epoxyethyl group, an expoxyethyloxy group, a vinyl group, an isopropenyl group, a 1-phenylvinyl group, a 4-vinylphenyl group, an isocyanate group, and a hydroxyl group. Since the affinities of these substituents with a resin polymer molecule are high, the efficiency of intercalating the resin polymer molecule between layers of the organically modified layered silicate can be improved and the dispersability of the organically modified layered silicate in a resin can be more improved. As described above, the substituent may replace a hydrogen atom that is not substituted with the substituted or non-substituted alkyl group of the substituted silyl group.

Herein, when the substituted or non-substituted alkyl group is an alkyl group having a substituent, the substituent is selected from the group including an amino group, an epoxyethyl group, an epoxyethyloxy group, a vinyl group, an isopropenyl group, a 1-phenylvinyl group, a 4-vinylphenyl group, an isocyanate group and a hydroxyl group. As described above, since the affinities of these substituents with a resin polymer molecule are high, the efficiency of intercalating the resin polymer molecule between layers of the organically modified layered silicate can be improved and the dispersability of the organically modified layered silicate in a resin can be more improved.

Preferably, the alkyl group has the substituent bonding to a terminal of the alkyl group at the opposite side of the silicon atom of the substituted silyl group (the carbon atom of the terminal of the alkyl group is substituted with the substituent). When the substituted or non-substituted alkyl group has the substituent bonding to a terminal of the alkyl group at the opposite side of the silicon atom of the substituted silyl group, the substituent is not shielded by the alkyl group and the probability of interaction of a resin polymer molecule with the substituent becomes high. Therefore, the affinity of the substituent with a resin polymer molecule can be improved and the organically modified layered silicate can be dispersed in a resin more efficiently.

Also, the number of carbon atoms contained in an individual substituted or non-substituted alkyl group boding to the silicon atom of the substituted silyl group is preferably 3 or greater and 18 or less.

Herein, if the number of carbon atoms contained in the alkyl group is less than 3, the length of an alkyl group contained in the substituted silyl group is small and the space between layers of the organically modified layered silicate may not sufficiently be increased. Therefore, it may be difficult to intercalate a resin polymer molecule between layers of the organically modified layered silicate and the dispersability of layers of the organically modified layered silicate in a resin may be degraded. As a result, the gas barrier properties of a resin composition and a resin molded object obtained by molding the resin composition may be degraded.

On the other hand, if the number of carbon atoms contained in the alkyl group is greater than 18, the length of an alkyl group contained in the substituted silyl group is large and the rate of the space occupied by the substituted silyl group in the space between layers of the organically modified layered silicate may become high. Therefore, it may be difficult to intercalate a resin polymer molecule between layers of the organically modified layered silicate and the dispersability of layers of the organically modified layered silicate in a resin may be degraded. As a result, the gas barrier properties of a resin composition and a resin molded object obtained by molding the resin composition may be degraded.

That is, when the number of carbon atoms contained in the alkyl group is 3 or greater and 18 or less, a resin can be efficiently intercalated between layers of the organically modified layered silicate and the dispersability of layers of the organically modified layered silicate in a resin can be improved.

Also, when the substituted or non-substituted alkyl group is an alkyl group having a substituent, the alkyl group may have an atomic group described below, which bonds to a terminal of the alkyl group at the opposite side of the silicon atom of the substituted silyl group (the carbon atom of the terminal of the alkyl group may bond to the atomic group). In this case, the atomic group is selected from the group including an amide linkage, an ester linkage, an N-oxymethyleneamino group (—OCH$_2$NH—) and an N,N-di(oxymethylene) amino group ((—OCH$_2$)$_2$N—). Since the affinities of these atomic groups with a resin polymer molecule are high, the efficiency of intercalating a resin polymer molecule between layers of the organically modified layered silicate can be improved and the dispersability of the organically modified layered silicate in a resin can be more improved.

When the substituted or non-substituted alkyl group has the atomic group bonding to a terminal of the alkyl group at the opposite side of the silicon atom of the substituted silyl group, the atomic group is not shielded by the alkyl group and the probability of interaction of a resin polymer molecule with the substituent becomes high. Therefore, the affinity of the substituent with a resin polymer molecule can be improved and the organically modified layered silicate can be dispersed in a resin more efficiently.

Also, the atomic group has at least one (1 or greater and 2 or less) further alkyl group. That is, at least one (1 or greater and 2 or less) of the valences of the atomic group is replaced by a further alkyl group. Herein, for explanation, an alkyl group which bonds to the silicon atom of the substituted silyl group and has the atomic group is referred to as the first alkyl group and an alkyl group which does not bond to the silicon atom of the substituted silyl group and bonds to the atomic group is referred to as the second alkyl group.

Herein, the second alkyl group may be either a linear alkyl group or a branched alkyl group, similarly to as the first alkyl group. Specifically, the second alkyl group is selected from the group including a methyl group, and an ethyl group and, linear and branched, propyl groups, butyl groups, pentyl groups, hexyl groups, heptyl groups, octyl groups, nonyl groups, decyl groups, undecyl groups, dodecyl groups, tridecyl groups, tetradecyl groups, pentadecyl groups, hexadecyl groups, heptadecyl groups, octadecyl groups, nonadecyl groups, and icosyl groups. Further, the second alkyl group may have a substituent or may not have a substituent. Also, the position of the substituent in the second alkyl group is an arbitrary possible position but, preferably, a terminal of the alkyl group at the opposite side of the atomic group.

Additionally, each of the plural valences of the atomic group may bond to either the first alkyl group or the second alkyl group.

Also, when the second alkyl group is an alkyl group having a substituent, the substituent is selected from the group including an amino group, an epoxyethyl group, an epoxyethyloxy group, a vinyl group, an isopropenyl group, a 1-phenylvinyl group, a 4-vinylphenyl group, an isocyanate group, and a hydroxyl group. Since the affinities of these substituents with a resin polymer molecule are high, the efficiency of intercalating a resin polymer molecule between layers of the organically modified layered silicate can be improved and the dispersability of the organically modified layered silicate in a resin can be more improved.

Preferably, the second alkyl group has a substituent bonding to a terminal of the alkyl group at the opposite side of the atomic group (the carbon atom of the terminal of the second alkyl group is substituted with a substituent). When the second alkyl group has the substituent bonding to a terminal of the alkyl group at the opposite side of the atomic group, the substituent is not shielded by the alkyl group and the probability of interaction of a resin polymer molecule with the substituent becomes high. Therefore, the affinity of the substituent with a resin polymer molecule can be improved and the organically modified layered silicate can be dispersed in a resin more efficiently.

Thus, when the substituted silyl group has both the atomic group and the substituent, the affinity of the substituted silyl group with a resin polymer molecule can be further improved and the efficiency of intercalating a resin polymer molecule between layers of the organically modified layered silicate can be further improved. Therefore, the dispersability of the organically modified layered silicate in a resin becomes better.

Also, the total of the number of carbon atoms contained in the first alkyl group and the number of carbon atoms contained in the second alkyl group is preferably 3 or greater and 18 or less.

Herein, if the total of the number of carbon atoms contained in the first and second alkyl groups is less than 3, the length of a carbon chain contained in the substituted silyl group is small and the space between layers of the organically modified layered silicate may not sufficiently be increased. Therefore, it may be difficult to intercalate a resin polymer molecule between layers of the organically modified layered silicate and the dispersability of layers of the organically modified layered silicate in a resin may be degraded. As a result, the gas barrier properties of a resin composition and a resin molded object obtained by molding the resin composition may be degraded.

On the other hand, if the total of the number of carbon atoms contained in the first and second alkyl groups is greater than 18, the length of a carbon chain contained in the substituted silyl group is large and the rate of the space occupied by the substituted silyl group in the space between layers of the organically modified layered silicate may become high. Therefore, it may be difficult to intercalate a resin polymer molecule between layers of the organically modified layered silicate and the dispersability of layers of the organically modified layered silicate in a resin may be degraded. As a result, the gas barrier properties of a resin composition and a resin molded object obtained by molding the resin composition may be degraded.

That is, when the total of the number of carbon atoms contained in the first and second alkyl groups is 3 or greater and 18 or less, a resin can be efficiently intercalated between layers of the organically modified layered silicate and the dispersability of layers of the organically modified layered silicate in a resin can be improved.

Next, examples of the organically modified layered silicate described above are described using FIG. 1A through FIG. 1E.

Figure 1B:
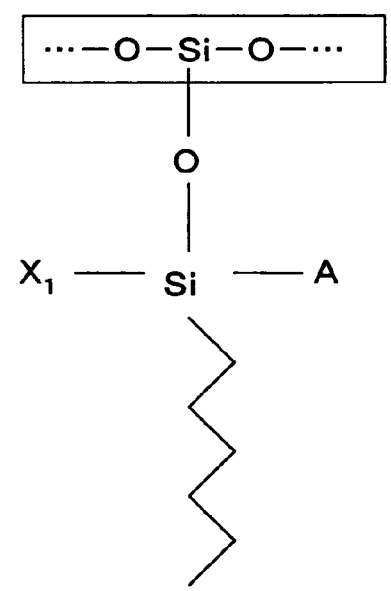
FIG. 1B is a diagram which schematically illustrates an example of an organically modified layered silicate contained in a resin composition according to the present invention.
Figure 1C:
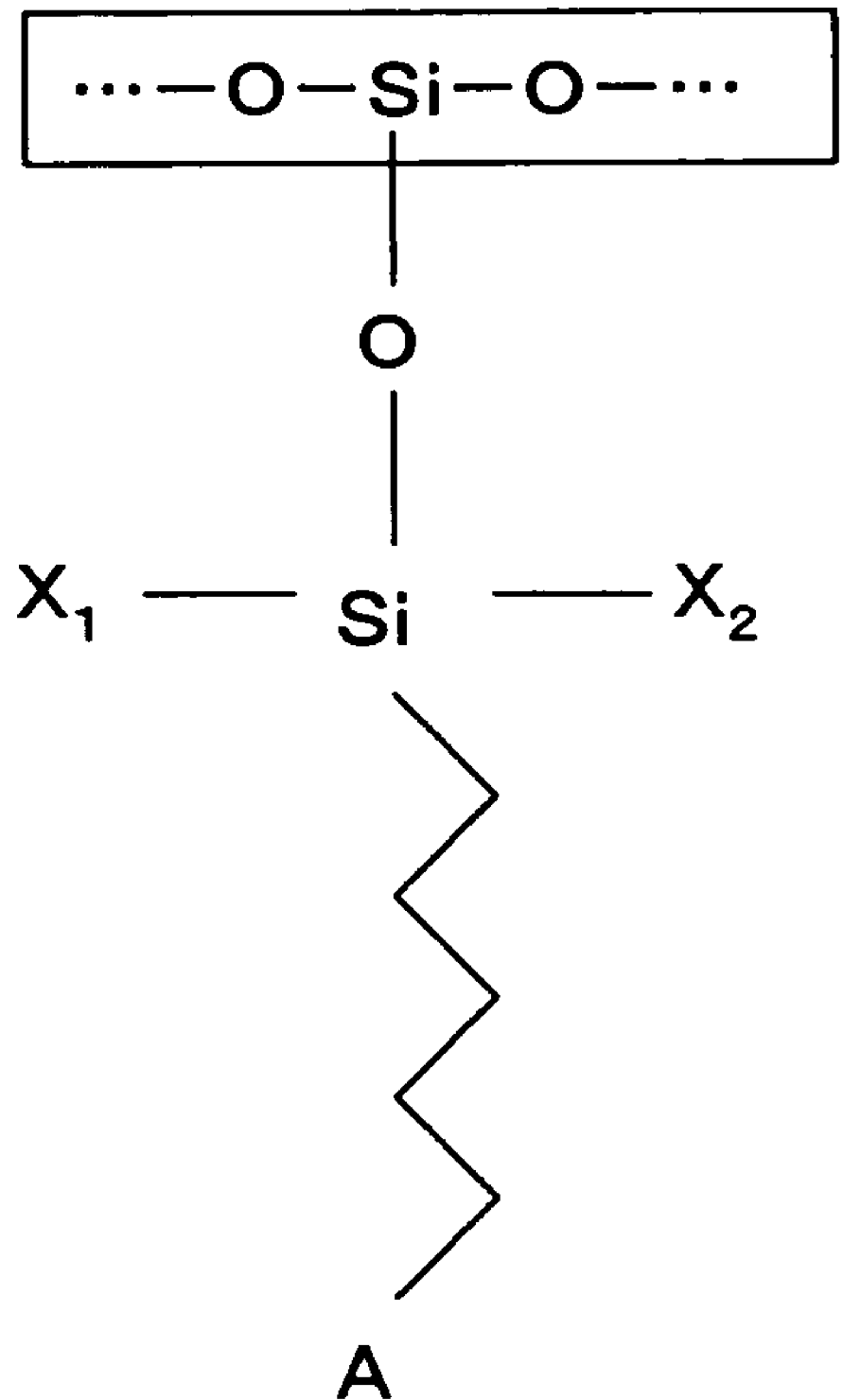
FIG. 1C is a diagram which schematically illustrates an example of an organically modified layered silicate contained in a resin composition according to the present invention.
Figure 1D:
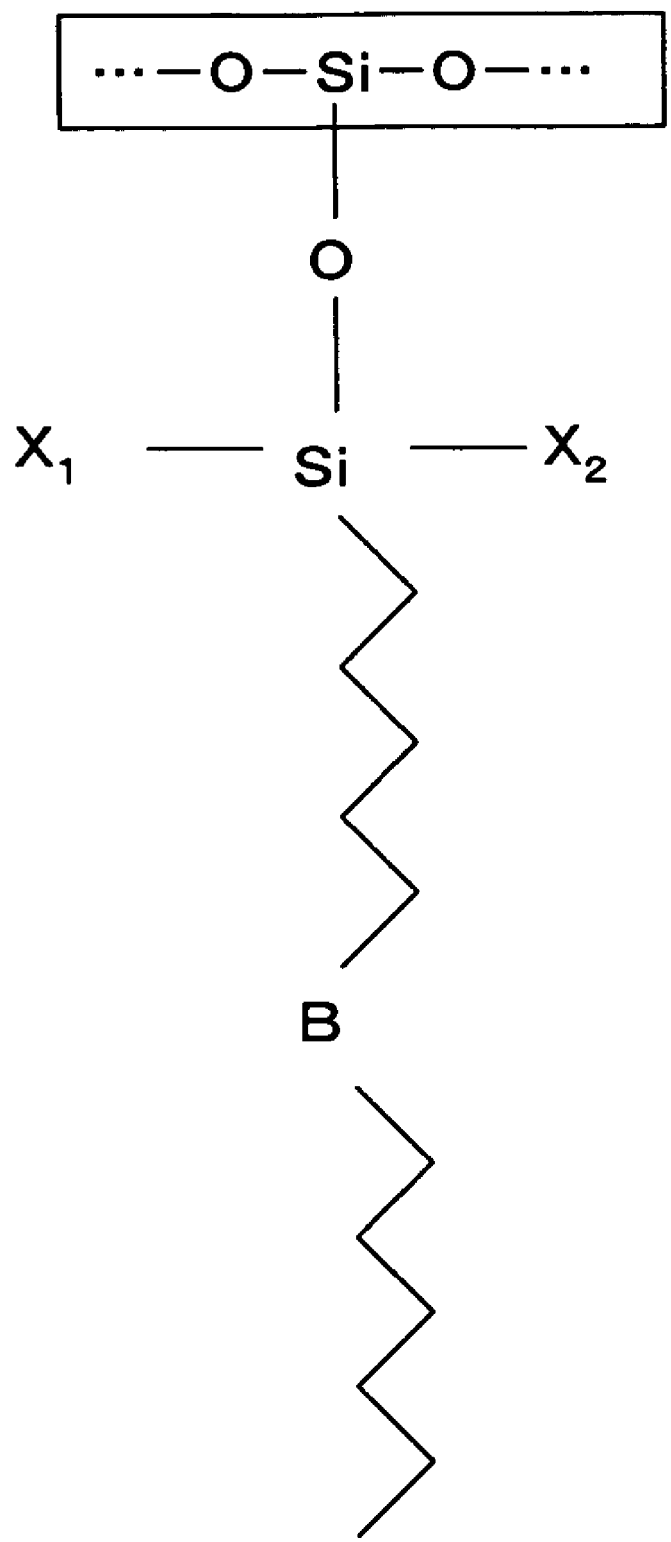
FIG. 1D is a diagram which schematically illustrates an example of an organically modified layered silicate contained in a resin composition according to the present invention.
Figure 1E:
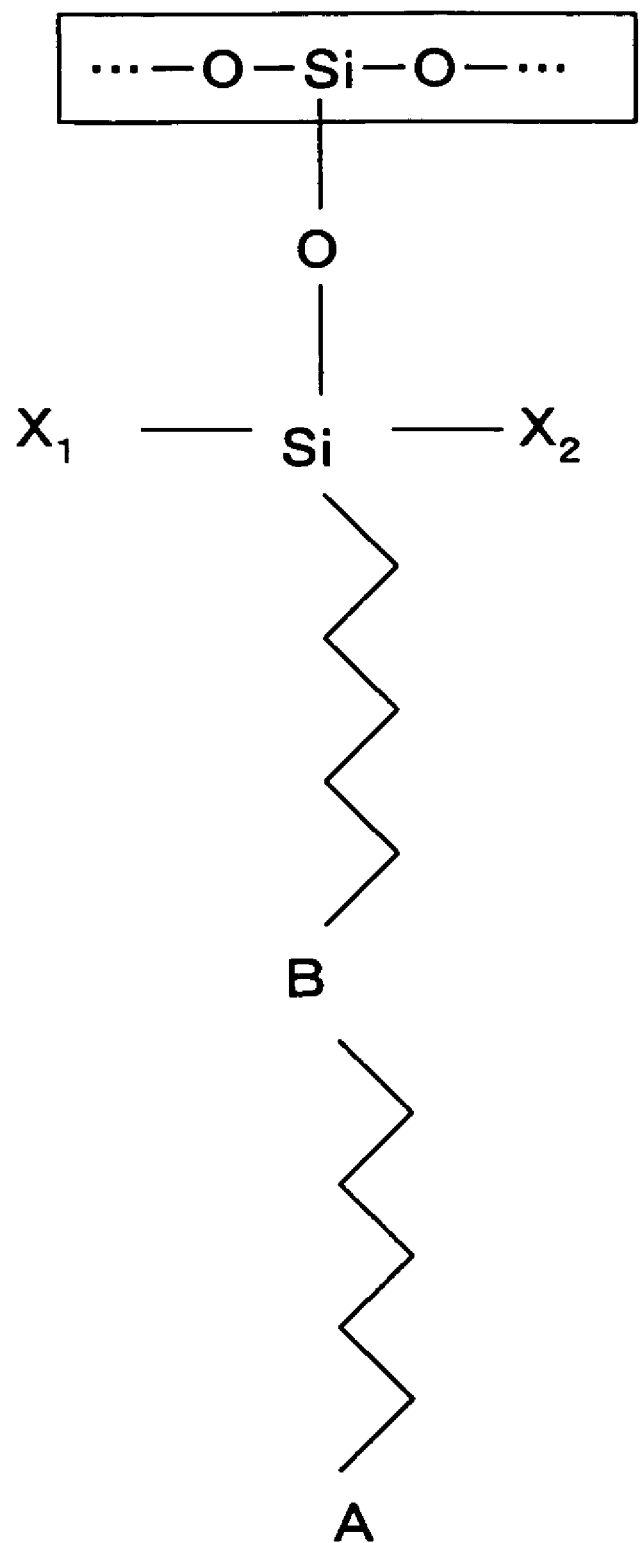
FIG. 1E is a diagram which schematically illustrates an example of an organically modified layered silicate contained in a resin composition according to the present invention.
Figure 2A:
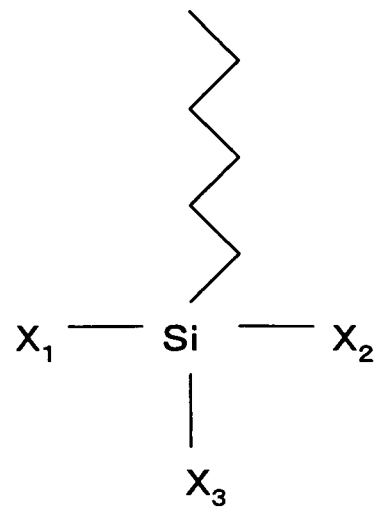
FIG. 2A is a diagram showing an example of a silane compound used for obtaining an organically modified layered silicate contained in a resin composition according to the present invention.
Figure 2B:
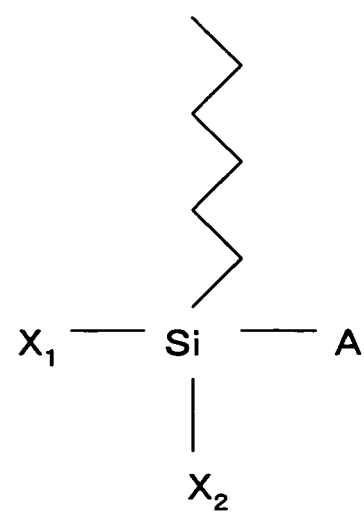
FIG. 2B is a diagram showing an example of a silane compound used for obtaining an organically modified layered silicate contained in a resin composition according to the present invention.
Figure 2C:
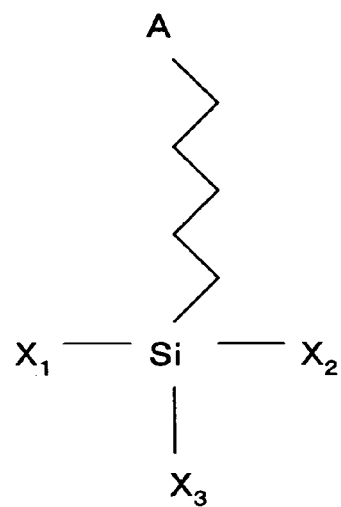
FIG. 2C is a diagram showing an example of a silane compound used for obtaining an organically modified layered silicate contained in a resin composition according to the present invention.
Figure 2D:
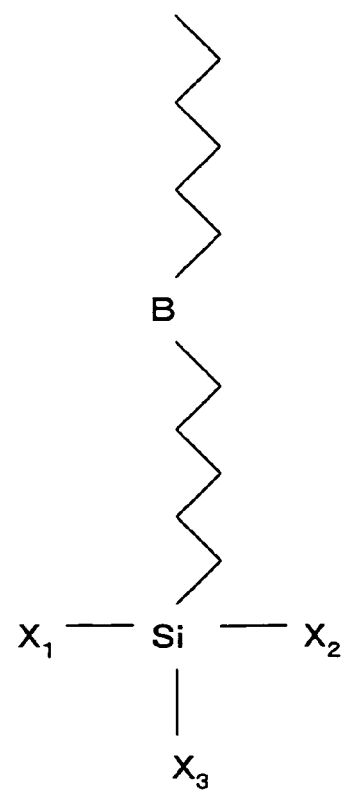
FIG. 2D is a diagram showing an example of a silane compound used for obtaining an organically modified layered silicate contained in a resin composition according to the present invention.
Figure 2E:
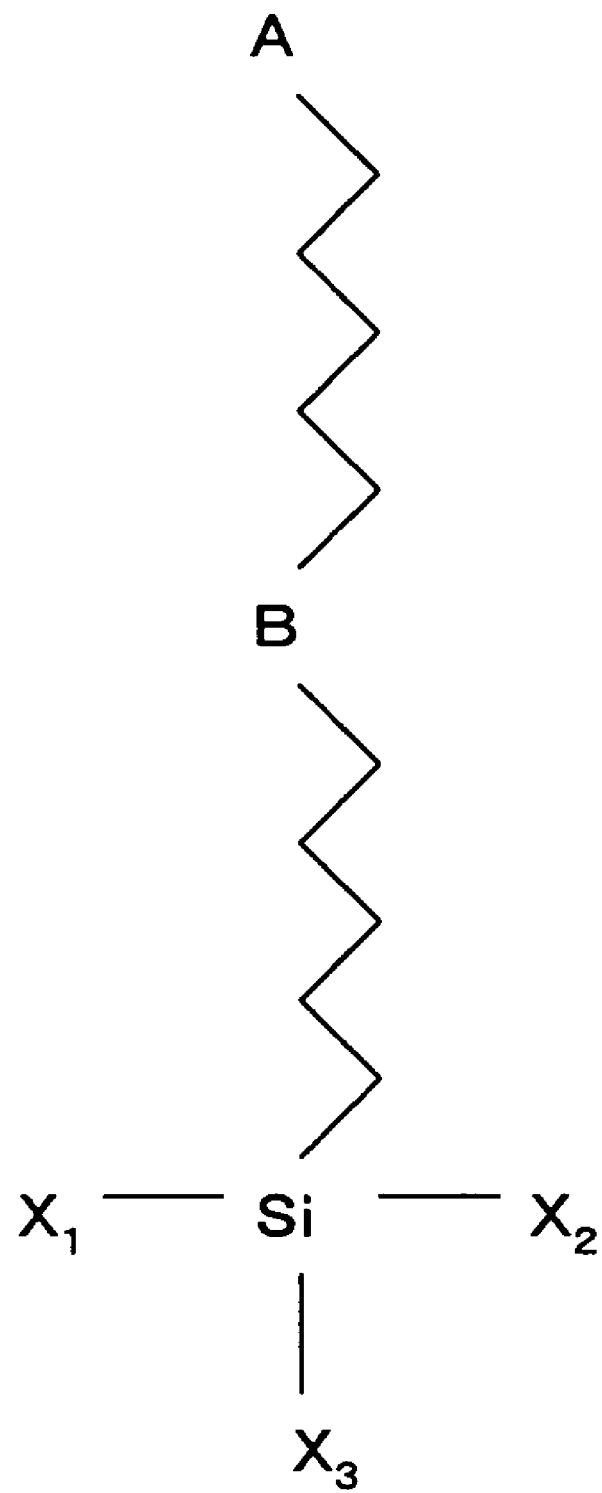
FIG. 2E is a diagram showing an example of a silane compound used for obtaining an organically modified layered silicate contained in a resin composition according to the present invention.

FIG. 1A through FIG. 1E are diagrams which schematically illustrate examples of an organically modified layered silicate contained in a resin composition according to the present invention. FIG. 1A is a diagram showing an example of an organically modified layered silicate in which a substituted silyl group having a non-substituted alkyl group bonds to a layered silicate. FIG. 1B is a diagram showing an example of an organically modified layered silicate in which a substituted silyl group having a substituent bonding to a silicon atom thereof bonds to a layered silicate. FIG. 1C is a diagram showing an example of an organically modified layered silicate in which a substituted silyl group having an alkyl group wherein a substituent bonds to a terminal thereof bonds to a layered silicate. FIG. 1D is a diagram showing an example of an organically modified layered silicate in which a substituted silyl group having the first and second alkyl groups bonding to an atomic group bonds to a layered silicate. FIG. 1E is a diagram showing an example of an organically modified layered silicate in which a substituted silyl group having the first alkyl group bonding to an atomic group and the second alkyl group bonding to the atomic group and a substituent bonds to a layered silicate.

In FIG. 1A through FIG. 1E, a layered silicate is represented by ... —O—Si—O— ... , and a silanol group substituted with a substituted silyl group is represented by Si—O—.

Also, a substituted silyl group has one alkyl group in FIG. 1A, FIG. 1B, and FIG. 1C or two alkyl groups (the first and second alkyl groups) in FIGS. 1D and 1E. Each of these alkyl groups is represented by one polygonal line and a vertex of the polygonal line represents a methylene group (—CH$_2$—). Each of the alkyl groups in FIG. 1A through FIG. 1E represents a linear pentyl group. Additionally, although the number of a substituted or non-substituted alkyl group(s) bonding to the silicon atom of the substituted silyl group is one in FIG. 1A through FIG. 1E, the number of a substituted or non-substituted silyl group(s) bonding to the silicon atom of a substituted silyl group may be two or three in an organically modified layered silicate contained in a resin composition according to the present invention.

On the other hand, the substituted silyl group has substituents $X_1$ and $X_2$ as well as the alkyl group (or has only $X_1$ in FIG. 1B), each of the substituents $X_1$ and $X_2$ is substituted with a substituent selected from the group including a hydroxyl group, a chloro group, a methyl group, an ethyl group, a methoxy group, and an ethoxy group, or is a single bond to the oxygen atom of another silanol group (in many cases, of the layered silicate) which is adjacent to the silanol group to which the substituted silyl group bonds to.

Also, in FIG. 1B, FIG. 1C and FIG. 1E, the silicon atom of the substituted silyl group or the carbon atom of a terminal of the alkyl group is substituted with a substituent A. Herein, the substituent A is selected from the group including an amino group, an epoxyethyl group, an epoxyethyloxy group, a vinyl group, an isopropenyl group, a 1-phenylvinyl group, a 4-vinylphenyl group, an isocyanate group, and a hydroxyl group.

Further, in FIG. 1D and FIG. 1E, an atomic group B bonds to the carbon atom at a terminal of the first alkyl group bonding to the silicon atom of the substituted silyl group and the atomic group B is selected from the group including an amide linkage, an ester linkage, an N-oxymethyleneamino group, and an N,N-di(oxymethylene)amino group. Although the atomic group B has one substituted or non-substituted second alkyl group in FIG. 1D and FIG. 1E, the substituted silyl group may have the third alkyl group bonding to the atomic group B in addition to the second alkyl group bonding to the atomic group B, depending on the atomic group B, in an organically modified layered silicate contained in a resin composition according to the present invention.

Next, a method of manufacturing an organically modified layered silicate contained in a resin composition according to the present invention is described with FIG. 2A through FIG. 2E.

First, a commercially available layered silicate is obtained or a layered silicate is synthesized by a publicly known method. Herein, a layered silicate is a compound having a ≡Si—O$^-$ group and a counter ion selected from a Na$^+$ and a K$^+$ between plural layers (of SiO$_2$) formed by bonding a Si and an O to each other. As a layered silicate, specifically, there can be provided kanemite (NaHSi$_2$O$_5$), makatite (NaSi$_4$O$_9$.xH$_2$O), magadiite (Na$_2$Si$_{14}$O$_{29}$.xH$_2$O), and kenyaite (K$_2$Si$_{20}$O$_{41}$.xH$_2$O) (x is the number of hydrated water). Among these, a particularly preferred layered silicate is magadiite.

Next, preferably, the layered silicate may be reacted with a salt selected from the group including a quaternary ammonium salt (R$_4$N$^+$X$^-$), an alkylammonium salt (RNH$^{3+}$X$^-$), and an alkylphosphonium salt (R$_4$P$^+$X$^-$), so that a cation (Na$^+$, K$^+$) in the layered silicate is ion-exchanged for an organic onium ion selected from the group including a quaternary ammonium ion, an alkylammonium ion, and an alkylphosphonium ion (Additionally, R is a linear alkyl group and X is halogen). Thus, when a cation in the layered silicate is ion-exchanged for an organic onium ion as described above, the space between layers of the layered silicate can be increased. Accordingly, the reaction of a silane compound described below to the layered silicate can be accelerated. Additionally, in the method for manufacturing an organically modified layered silicate according to the present invention, it is preferable that a cation in the layered silicate be ion-exchanged for an alkyltrimethylammonium halide as a quaternary ammonium salt. Since an alkyltrimethylammonium ion originating from the alkyltrimethylammonium halide has 3 shorter methyl groups and 1 longer alkyl group which bond to the nitrogen atom thereof, the space between layers of the layered silicate is increased with 1 longer alkyl group while other 3 methyl groups do not inhibit the ion-exchange with the alkyltrimethylammonium ion and the reaction with a silane compound. Also, a commercially available product can be utilized for the salt described above.

Then, the layered silicate (ion-exchanged with the organic onium ion) is silylated with a proper silane compound to obtain an organically modified layered silicate. Herein, when a cation in the layered silicate is ion-exchanged for the organic onium ion, all the organic onium ions contained in the layered silicate are substantially replaced by silyl groups originating from a used silane compound. FIG. 2A through FIG. 2E show examples of a silane compound used for obtaining an organically modified layered silicate contained in a resin composition according to the present invention, that is, a silane compound for silylating a layered silicate (ion-exchanged with an organic onium ion). Specifically, silane compounds shown in FIG. 2A through FIG. 2E are used for obtaining the organically modified layered silicates shown in FIG. 1A through FIG. 1E, respectively. Herein, a polygonal line, A, B, $X_1$ and $X_2$ in FIG. 2 are the same as those shown in FIG. 1. Also, $X_3$ is selected from the group including a hydroxyl group, a chloro group, a methyl group, an ethyl group, a methoxy group and an ethoxy group, similarly to $X_1$ and $X_2$. For such a silane compound, a commercially available product can be obtained or it can be synthesized by a publicly known method.

An organically modified layered silicate contained in a resin composition according to the present invention can be obtained by silylating a Si—O$^-$ group of the layered silicate (ion-exchanged with an organic onium ion) with a silane compound as described above. The silylation of a Si—O⁻ group of the layered silicate (ion-exchanged with an organic onium ion) is conducted by utilizing the fact that the substituents $X_1$, $X_2$, and $X_3$ have a high reactivity to a Si—O⁻ group which substituents bond to the silicon atom of a silane compound as described above and are selected from the group including a hydroxyl group, a chloro group, a methyl group, an ethyl group, a methoxy group and an ethoxy group. That is, at least one (1 or greater and 3 or less) of the substituents $X_1$, $X_2$, and $X_3$ bonding to the silicon atom of a silane compound as described above is removed and bonding is made to the oxygen atom of a Si—O⁻ group, whereby the silylation of the Si—O⁻ group is attained. Herein, the substituent $X_1$, $X_2$, or $X_3$ which does not make bonding to the oxygen atom of a Si—O⁻ group and bonds to the silicon atom of a silane compound remains unreacted or is converted to a hydroxyl group by means of treatment with water.

In a resin composition according to the present invention, the percentage of an organically modified layered silicate in a resin is 0.1% by mass or greater and 20% by mass or less, preferably 0.5% by mass or greater and 10% by mass or less, more preferably 1% by mass or greater and 7% by mass or less. If the percentage of an organically modified layered silicate in a resin is less than 0.1% by mass, the gas barrier property of a resin molded object may be insufficient. On the other hand, if the percentage of an organically modified layered silicate in a resin is greater than 20% by mass, the cost of a resin composition may become high.

Also, a resin composition according to the present invention may contain a commonly used additive, for example, an anti-oxidizing agent, a thermal stabilizer, an ultraviolet light absorber, a lubricant, an anti-static agent, a frame retardant, a crystallization accelerating agent, a terminal blocking agent, a filler, etc., as well as a resin and an organically modified layered silicate as long as the characteristic of a resin composition or resin molded object according to the present invention is deteriorated. One kind of these additives may be used singularly, or two or more kinds of these additives may be used in combination. Specifically, there can be provided: as an anti-oxidizing agent, hindered phenolic anti-oxidizing agents such as p-t-butylhydroxytoluene and p-t-butylhydroxyanisole; as a thermal stabilizer, triphenylphosphite, trilaurylphosphite, trisnonylphenylphosphite, etc.; as an ultraviolet light absorber, p-t-butylphenyl salicylate, 2-hydroxy-4-methoxybenzophenone, 2-hydroxy-4-methoxy-2'-carboxybenzophenone, 2,4,5-trihydroxybutyrophenone, etc.; as a lubricant, calcium stearate, zinc stearate, barium stearate, sodium palmitate, etc.; as an anti-static agent, N,N-bis(hydroxyethyl)alkylamines, alkylamines, alkylarylsulfonates, alkylsulfonates, etc.; as a frame retardant, hexabromocyclododecane, tris-(2,3-dichloropropyl)phosphate, pentabromophenyl aryl ether, etc.; as a crystallization accelerating agent, talc, boron nitrite, polyethylene terephthalate, poly(trans-cyclohexanedimethanol terephthalate), etc.; as a terminal blocking agent, carbodiimide compounds such as 1,3-diisopropylcarbodiimide, N,N'-dicyclohexylcarbodiimide, and N,N'-diisopropylphenylcarbodiimide, epoxy compounds such as polyethylene glycol diglycidyl ether and polypropylene glycol diglycidyl ether, and isocyanate compounds such as hexamethylene diisocyanate; as an inorganic filler, calcium carbonate, silica, titanium oxide, talc, mica, barium sulfate, alumina, etc; and as an organic filler, wood flour, hull, waste papers such as a newspaper, each kind of starch (including pregelatinized starch, etc.), celluloses, etc. One kind of the compounds listed as respective additives may be used singularly or two or more kinds of the compounds listed as respective additives may be used in combination.

Next, a method for manufacturing a resin composition according to the present invention is described. A resin composition according to the present invention can be obtained by melting and kneading a desired resin, a desired organically modified layered silicate, and, if necessary, an additive in a predetermined proportion. The melting and kneading are performed by means of heating to temperature at or above the melting point or softening point of the resin. Practically, the melting and kneading may be performed by using a general kneader such as a uniaxial extruder, a biaxial extruder, a roll kneader, and Brabender, but it is preferable to use a biaxial extruder in order to uniformly disperse an organically modified layered silicate in a resin by applying shear force at the time of heating. Also, in regard to a resin composition according to the present invention, the dispersability of an organically modified layered silicate in a resin can be confirmed by observation of the resin composition using an electron microscope.

Also, a resin composition according to the present invention can be manufactured by a publicly known interlayer polymerization method. That is, a monomer capable of forming a desired resin and a desired organically modified layered silicate are mixed in a predetermined proportion and the monomer is polymerized by a method such as heating under the presence of a proper catalyst. Thus, the monomer is polymerized so as to form a desired resin and a resin composition can be obtained in which a desired organically modified layered silicate is dispersed in a desired resin.

For example, when a resin composition in which an organically modified layered silicate is dispersed in poly(lactic acid) is manufactured by the interlayer polymerization method, the organically modified layered silicate is mixed into lactide as a monomer for poly(lactic acid), which is a dimer of lactic acid, and a slight amount of tin octoate as a polymerization catalyst is added into the mixture. Then, the mixture of the lactide, the organically modified layered silicate, and the tin octoate is heated at temperature of approximately 160° C. so as to polymerize the lactide and form poly(lactic acid) and a resin composition can be obtained in which the organically modified layered silicate is dispersed in the poly(lactic acid). Additionally, since an organically modified layered silicate contained in a resin composition according to the present invention contains no ammonium ion, the activity of tin octoate as a catalyst is not lowered. Therefore, the interlayer polymerization method can be preferably used as a method for manufacturing a resin composition containing poly(lactic acid) and an organically modified layered silicate according to the present invention.

Next, a resin molded object according to the present invention is briefly described. A resin molded object according to the present invention can be obtained by molding a resin composition according to the present invention by at least one kind of molding methods including publicly known injection molding, blow molding, extrusion molding, vacuum molding, air-pressure forming, and inflation molding.

A resin molding object according to the present invention can be widely used as a living consumer item including a container for cosmetic and other durable goods. As specific examples of a resin molding object according to the present invention, there can be provided, for example, as an injection-molded object, living goods, packaging containers, and electric and electronic instruments; as a blow-molded object, containers for fluid such as beverages, cosmetics, etc., containers for foods or drugs, and tanks for fuel, etc.; as an extrusion-molded object, whole cloth sheets for deep draw forming, whole cloth sheets for batch-type foaming, cards such as credit cards, films and sheets for packaging, agriculture, or industry such as underlay and clear-files, and pipes such as straws and rigid pipes for agriculture or gardening; and as a vacuum-molded object and an air-pressure formed object, food containers such as trays for fresh foods, instant food containers, fast food containers and lunch boxes, blister pack containers for show-window and pre-through pack containers for drugs.

Example 1

Practical Example

Dodecyltrichlorosilane as a silane compound was reacted to magadiite as a layered silicate to obtain a silylated layered silicate. The silylated layered silicate was treated with water, whereby a chloro group remaining on a silyl group having a dodecyl group, which bonded to a silanol group of the layered silicate, was converted to a hydroxyl group, so as to obtain a product of organically modified layered silicate. The product of organically modified layered silicate was an organically modified layered silicate in which a silyl group having a dodecyl group bonded to the oxygen atom of a silanol group existing between layers of the magadiite. The obtained product of organically modified layered silicate was added to poly(lactic acid) as a resin and a resin composition (referred to as silylated clay composition, below) was obtained using melting and kneading. Herein, the content of the organically modified layered silicate in the resin composition was 4% by mass.

Figure 3:
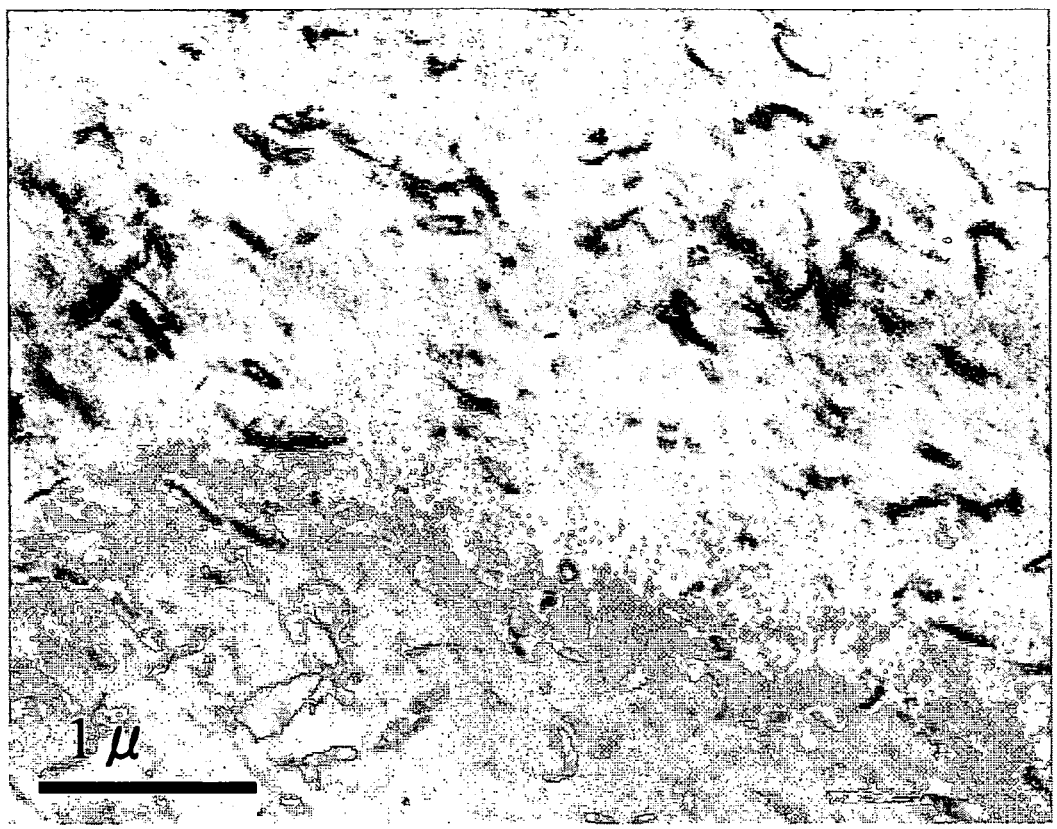
FIG. 3 is an electron microscope photograph of a resin composition according to the present invention which was obtained in a practical example.

Next, the obtained silylated clay composition was observed using an electron microscope. FIG. 3 is an electron microscope photograph of the obtained organically modified layered silicate (silylated clay composition). As shown in FIG. 3, it could be confirmed that, in the obtained silylated clay composition, the organically modified layered silicate which was smaller than 1 μm (had a nanometer size) was uniformly dispersed in poly(lactic acid) and, thus, the obtained silylated clay composition was a polymer nanocomposite.

Next, the elastic modulus of the silylated clay composition as a mechanical property thereof was measured. As a result, the elastic modulus of the silylated clay composition was $1.7 \times 10^9$ Pa.

Also, the oxygen permeability of the silylated clay composition as a gas barrier property thereof was measured. As a result, the oxygen permeability of the silylated clay composition was 92 $cm^3/m^2 \cdot 24$ hours·atm.

Further, the color of the silylated clay composition was evaluated by visual observation. As a result, the colors of the silylated clay composition and the poly(lactic acid) were colorless and clear. Also, the yellowness index of the silylated clay composition was measured using a color difference meter. As a result, the yellowness index of the silylated clay composition was 14. Herein, the yellowness index means that the smaller the numeral of yellowness index is, it is close to white color, while the greater the numeral of yellowness index is, it is tinged with yellow color.

Finally, the rate of hydrolysis of the sililayed clay composition was measured as follows. First, the silylated clay composition was heat-pressed so as to make a pellet of the silylated clay composition and the mass of the pellet was measured. Next, the pellet of the silylated clay composition was dipped in water at 50° C. for 10 days. Herein, the volume of the water corresponded to 10 times of the volume of the pellet. Subsequently, the pellet of the silylated clay composition was removed from the water and dried, and the mass of the remaining pellet of the silylated clay composition was measured. As the mass ratio of the pellets before and after the dipping in the water was calculated, the percentage of the mass of the remaining silylated clay composition after the dipping in the water for the 10 days was 93% by mass.

Comparative Example 1

Next, as a comparative example against the obtained silylated clay composition, poly(lactic acid) containing no organically modified layered silicate was prepared and tests similar to those for the practical example were performed.

First, the elastic modulus of the poly(lactic acid) was $1.3 \times 10^9$ Pa and the oxygen permeability of the poly(lactic acid) was 200 $cm^3/m^2 \cdot 24$ hours·atm. Also, the color of the poly (lactic acid) was evaluated by visual observation and, as a result, the color of the poly(lactic acid) was colorless and clear. Then, the yellowness index of the poly(lactic acid) was measured using a color difference meter and the yellowness index of the poly(lactic acid), 11, was obtained.

Comparative Example 2

Next, as a comparative example against the obtained silylated clay composition, a resin composition (referred to as an ammonium salt clay composition, below) was prepared which was obtained by melting and kneading an organically modified clay mineral in poly(lactic acid) in which clay mineral a cation of a clay mineral was ion-exchanged for a quaternary ammonium ion. Specifically, the organically modified clay mineral was an organically modified clay mineral obtained by ion-exchanging of an inorganic ion of a synthesized mica available from Chemical Co., Ltd. (fluorinated mica, commercial name: ME100) using a salt containing a dodecylbis(hydroxyethyl)methylammonium ion (commercial name: ETHOQUAD C12, available from LION AKZO CO., LTD.).

Next, tests similar to those for the practical example were performed for the ammonium salt clay composition.

First, the elastic modulus of the ammonium salt clay composition was $1.5 \times 10^9$ Pa and the oxygen permeability of the ammonium salt clay composition was 89 $cm^3/m^2 \cdot 24$ hours·atm. Also, the color of the ammonium salt clay composition was evaluated by visual observation and, as a result, the color of the ammonium salt clay composition was yellow. Then, the yellowness index of the ammonium salt clay composition was measured using a color difference meter and the yellowness index of the ammonium salt clay composition, 20, was obtained. Further, the rate of hydrolysis of the ammonium salt clay composition was measured similarly to the practical example. As the mass ratio of pellets of the ammonium salt clay composition before and after the dipping in water was calculated, the percentage of the mass of the remaining ammonium salt clay composition after the dipping in the water for the 10 days was 76% by mass.

As described above, when the elastic modulus of the silylated clay composition as a mechanical property thereof was compared to the elastic modulus of the poly(lactic acid) and the elastic modulus of the ammonium salt clay composition, the elastic modulus of the silylated clay composition was greater than the elastic modulus of the poly(lactic acid) and the elastic modulus of the ammonium salt clay composition. Thus, it was confirmed that the obtained silylated clay composition has an excellent mechanical property compared to the poly(lactic acid) and the ammonium salt clay composition.

Next, the oxygen permeability of the silylated clay composition as a gas barrier property thereof was compared to the oxygen permeability of the poly(lactic acid) and the oxygen permeability of the ammonium salt clay composition, the oxygen permeability of the silylated clay composition was significantly smaller than the oxygen permeability of the poly(lactic acid) and comparable to the oxygen permeability of the ammonium salt clay composition. Thus, it was confirmed that the gas barrier property of the silylated clay composition was significantly high compared to the gas barrier property of the poly(lactic acid) and comparable to the gas barrier property of the ammonium salt clay composition.

Next, as the results of visual evaluation for the colors of the silylated clay composition, the poly(lactic acid), and the ammonium salt clay composition were compared, the colors of the silylated clay composition and the poly(lactic acid) were colorless and clear while the color of the ammonium salt clay composition was yellow. Also, as the results of measurements for the yellowness indices of the silylated clay composition, the poly(lactic acid), and the ammonium salt clay composition using the color difference meter were compared, the yellowness index of the silylated clay composition was significantly smaller than the yellowness index of the ammonium salt clay composition and close to the yellowness index of the poly(lactic acid). Thus, it could be confirmed that the silylated clay composition was different from the yellow ammonium salt clay composition and had a little yellow tint and a color close to that of the poly(lactic acid).

Next, as the rate of hydrolysis of the silylated clay composition was compared to the rate of hydrolysis of the ammonium salt clay composition, the percentage of mass of the remaining silylated clay composition after the dipping in the water for the 10 days was significantly higher than the percentage of mass of the remaining ammonium salt clay composition after the dipping in the water for the 10 days. Thus, it could be confirmed that the rate of hydrolysis of the silylated clay composition was significantly small compared to the rate of hydrolysis of the ammonium salt clay composition and the hydrolysis of the silylated clay composition was reduced compared to that of the ammonium salt clay composition.

Although the embodiments and examples of the present invention have been specifically described above, the present invention is not limited to these embodiments and examples but these embodiments and examples can be altered or modified without departing from the spirit and scope of the present invention.

APPENDIX

The first aspect of the present invention is a resin composition characterized by comprising a resin and an organically modified layered silicate in which a substituted silyl group having a substituted or non-substituted alkyl group bonds to a layered silicate. According to the first aspect of the present invention, a resin composition which reduces hydrolysis thereof and reduces the color change thereof at the time of heating can be provided.

The second aspect of the present invention is a resin composition according to the first aspect of the present invention, characterized in that the substituted silyl group has a substituent selected from the group consisting of an amino group, an epoxyethyl group, an epoxyethyloxy group, a vinyl group, an isopropenyl group, a 1-phenylvinyl group, a 4-vinylphenyl group, an isocyanate group, and a hydroxyl group. According to the second aspect of the present invention, a resin composition which improves the dispersibility of an organically modified layered silicate in a resin, reduces hydrolysis thereof, and reduces the color change thereof at the time of heating, can be provided.

The third aspect of the present invention is a resin composition according to the first aspect of the present invention, characterized in that the substituted or non-substituted alkyl group is a substituted alkyl group, wherein the substituted alkyl group has a substituent selected from the group consisting of an amino group, an epoxyethyl group, an epoxyethyloxy group, a vinyl group, an isopropenyl group, a 1-phenylvinyl group, a 4-vinylphenyl group, an isocyanate group, and a hydroxyl group, which substituent bonds to a terminal of the alkyl group. According to the third aspect of the present invention, a resin composition which further improves the dispersibility of an organically modified layered silicate in a resin, reduces hydrolysis thereof, and reduces the color change thereof at the time of heating, can be provided.

The fourth aspect of the present invention is a resin composition according to one of the first through third aspects of the present invention, characterized in that the number of carbon atoms contained in the alkyl group is 3 or greater and 18 or less. According to the fourth aspect of the present invention, a resin composition which well adjusts the dispersibility of an organically modified layered silicate in a resin, reduces hydrolysis thereof, and reduces the color change thereof at the time of heating, can be provided.

The fifth aspect of the present invention is a resin composition according to the first aspect of the present invention, characterized in that the substituted or non-substituted alkyl group is a substituted first alkyl group, wherein the substituted first alkyl group has an atomic group selected from the group consisting of an amide linkage, an ester linkage, an N-oxymethyleneamino group, and an N,N-di(oxymethylene)amino group, which atomic group bonds to a terminal of the first alkyl group, and the atomic group has a substituted or non-substituted second alkyl group. According to the fifth aspect of the present invention, a resin composition which improves the dispersibility of an organically modified layered silicate in a resin, reduces hydrolysis thereof, and reduces the color change thereof at the time of heating, can be provided.

The sixth aspect of the present invention is a resin composition according to the fifth aspect of the present invention, characterized in that the substituted or non-substituted second alkyl group is a substituted second alkyl group, wherein the substituted second alkyl group has a substituent selected from the group consisting of an amino group, an epoxyethyl group, an epoxyethyloxy group, a vinyl group, an isopropenyl group, a 1-phenylvinyl group, a 4-vinylphenyl group, an isocyanate group, and a hydroxyl group, which substituent bonds to a terminal of the second alkyl group. According to the sixth aspect of the present invention, a resin composition which further improves the dispersibility of an organically modified layered silicate in a resin, reduces hydrolysis thereof, and reduces the color change thereof at the time of heating, can be provided.

The seventh aspect of the present invention is a resin composition according to the fifth or sixth aspect of the present invention, characterized in that the total of the number of carbon atoms contained in the first alkyl group and the number of carbon atoms contained in the second alkyl group is 3 or greater and 18 or less. According to the seventh aspect of the present invention, a resin composition which well adjusts the dispersibility of an organically modified layered silicate in a resin, reduces hydrolysis thereof, and reduces the color change thereof at the time of heating, can be provided.

The eighth aspect of the present invention is a resin composition according to one of the first through seventh aspects of the present invention, characterized in that the resin is a biodegradable resin. According to the eighth aspect of the present invention, a resin composition which reduced contamination on an environment can be provided.

The ninth aspect of the present invention is a resin composition according to one of the first through seventh aspects of the present invention, characterized in that the biodegradable resin is poly(lactic acid). According to the ninth aspect of the present invention, a resin composition can be prepared more easily.

The tenth aspect of the present invention is a resin molded object characterized by being molded using a resin composition according to one of the first through ninth aspects of the present invention. According to the tenth aspect of the present invention, a resin molded object which reduces hydrolysis thereof and reduces quality change of content therein can be provided.

INDUSTRIAL APPLICABILITY

The present invention can be applied to a resin composition which reduces hydrolysis thereof and reduces the color change thereof at the time of heating and a resin molded object which reduces hydrolysis thereof and reduces quality change of content therein.

The invention claimed is:

1. A resin composition comprising a biodegradable resin and an organically modified layered silicate, the organically modified layered silicate comprising a layered silicate and a substituted silyl group, the substituted silyl group bonding to the layered silicate and comprising a substituted or non-substituted alkyl group, and the layered silicate being selected from the group consisting of kanemite, makatite, magadiite, and kenyaite,
   wherein the substituted silyl group further comprises a substituent and the substituent directly bonds to a silicon atom of the substituted silyl group,
   wherein the number of carbon atoms in the alkyl group is 3 or greater and 18 or less, and
   wherein the substituent is selected from the group consisting of an epoxyethyl group, an epoxyethyloxy group, a 1-phenylvinyl group, a 4-vinylphenyl group, and an isocyanate group.

2. A resin composition comprising a biodegradable resin and an organically modified layered silicate, the organically modified layered silicate comprising a layered silicate and a substituted silyl group, the substituted silyl group bonding to the layered silicate and comprising a substituted or non-substituted alkyl group, and the layered silicate being selected from the group consisting of kanemite, makatite, magadiite, and kenyaite,
   wherein the substituted or non-substituted alkyl group is a substituted first alkyl group, the substituted first alkyl group comprises a substituent, the substituent bonds to a terminal of the first alkyl group, and the substituent comprises a non-substituted second alkyl group, and
   wherein the total of the number of carbon atoms in the first alkyl group and the number of carbon atoms in the second alkyl group is 3 or greater and 18 or less, and
   wherein the substituent is selected from the group consisting of an N-oxymethyleneamino group and an N,N-di(oxymethylene)amino group.

3. A resin molded object, wherein the resin molded object is obtained by molding the resin composition as claimed in claim 1.

4. A resin molded object, wherein the resin molded object is obtained by molding the resin composition as claimed in claim 2.

* * * * *

UNITED STATES PATENT AND TRADEMARK OFFICE
CERTIFICATE OF CORRECTION

PATENT NO. : 7,973,102 B2
APPLICATION NO. : 10/580336
DATED : July 5, 2011
INVENTOR(S) : Shun Takahashi and Motoki Takata It is certified that error appears in the above-identified patent and that said Letters Patent is hereby corrected as shown below:

On the Title Page: Item (73) Assignee:
Please add "Unitika Ltd., Hyogo (JP)" as Assignee in addition to "Shiseido Company, Ltd., Tokyo (JP)"

Signed and Sealed this
Third Day of April, 2012

David J. Kappos
*Director of the United States Patent and Trademark Office*